Figure 1:
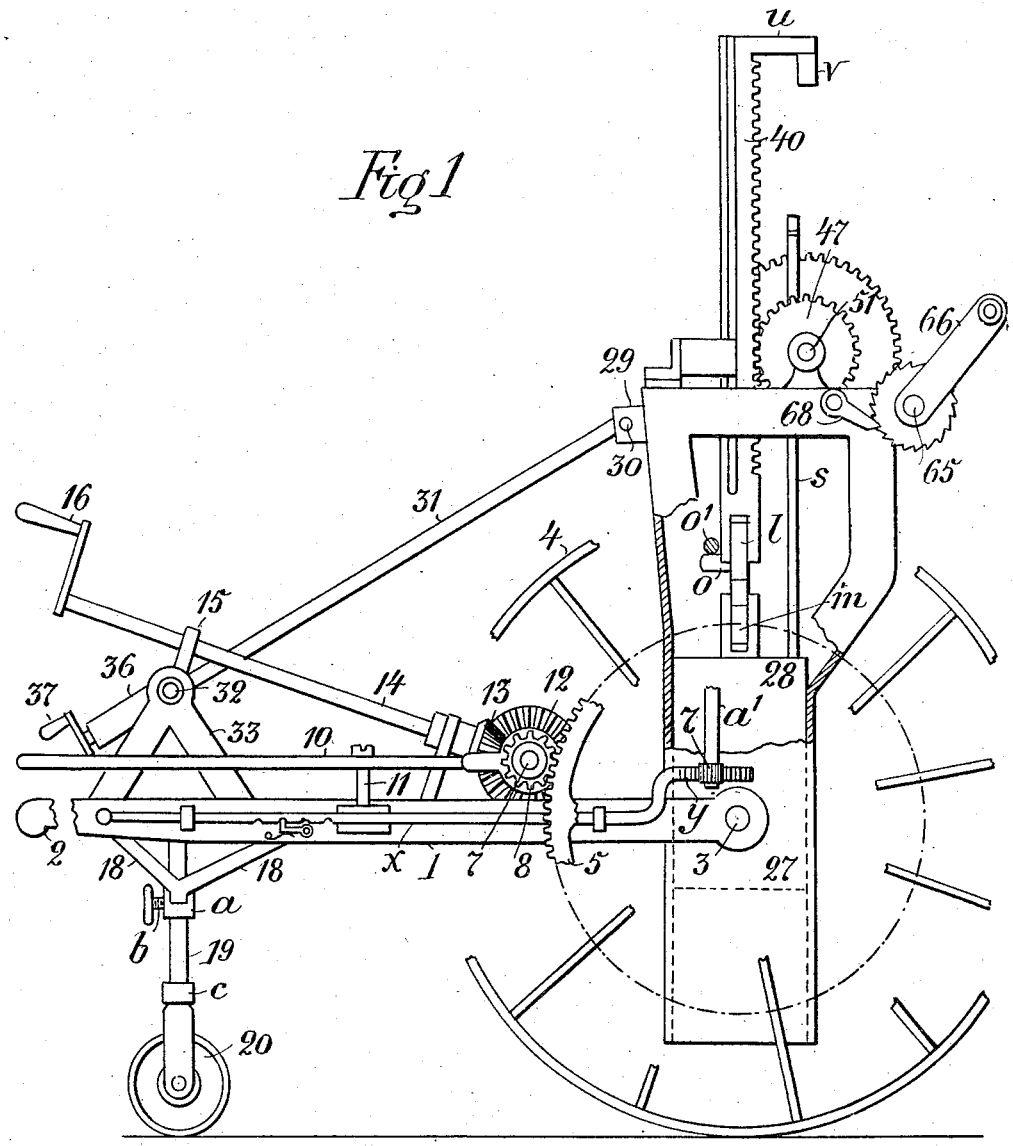

W. H. NORDSTRÖM & N. C. QVIST.
PAVING RAMMER.
APPLICATION FILED MAR. 27, 1909.

965,218.

Patented July 26, 1910.

2 SHEETS—SHEET 1.

Witnesses
H C Hunsberger
C Heymann

Inventors
Niels Christian Qvist
Wilhelm Hermann Nordström
by B Singer atty

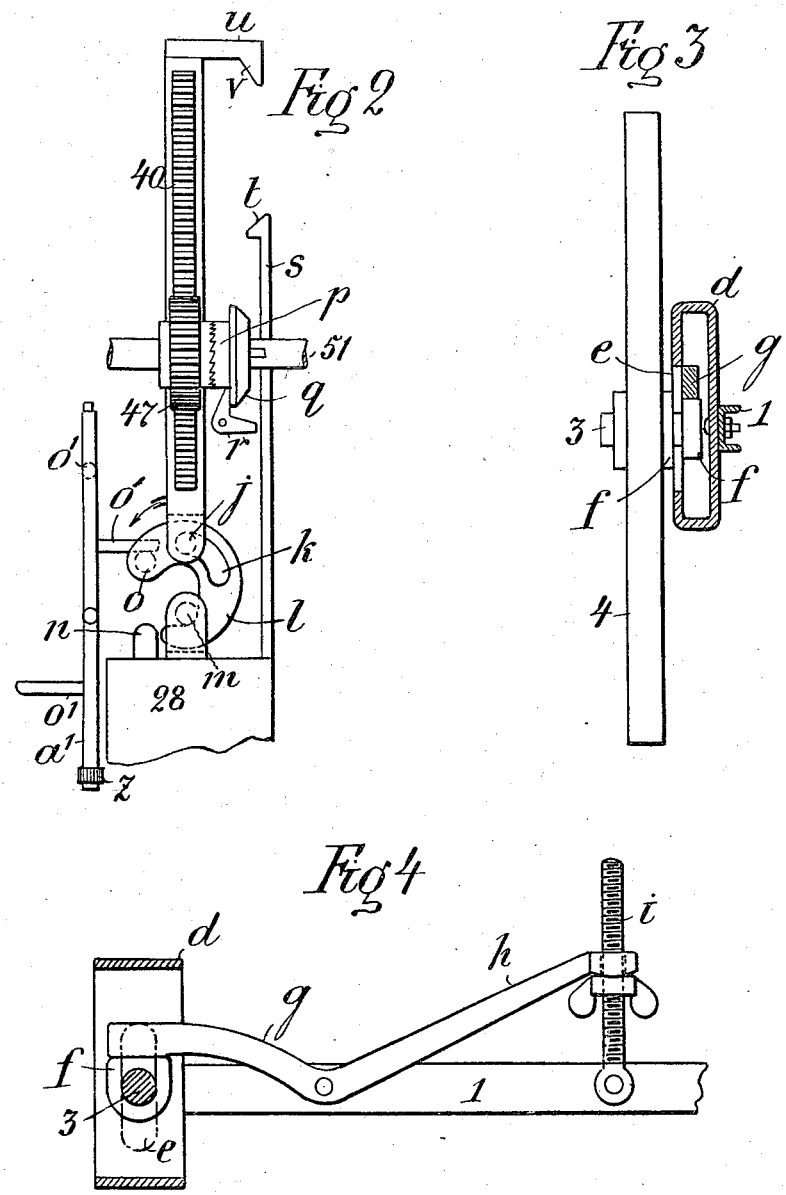

UNITED STATES PATENT OFFICE.

WILHELM HERMANN NORDSTRÖM AND NIELS CHRISTIAN QVIST, OF HORSENS, DENMARK.

PAVING-RAMMER.

965,218.  Specification of Letters Patent.  Patented July 26, 1910.

Application filed March 27, 1909. Serial No. 486,266.

*To all whom it may concern:*

Be it known that we, WILHELM HERMANN NORDSTRÖM and NIELS CHRISTIAN QVIST, subjects, respectively, of the Emperor of Germany and the King of Denmark, residing, respectively, at Smedegade 36 and Fabriksvej 29, Horsens, Denmark, have invented a new and useful Improvement in Paving-Rammers; and we do hereby declare the following to be a full, clear, and exact description of the same.

This invention relates to road making machines and more specifically to an improved mechanism for operating a gravity paving rammer.

It also relates to an improved mechanism for controlling the machine and for regulating the operation of the rammer.

An object of the invention is to provide a machine which may be easily steered in all directions and which may be brought into close proximity with the curb stone.

Another object of the invention is to provide a machine in which the frame of the rammer may be adjusted so that the rammer may strike the pavement at various angles.

Another object of the invention is to provide a rammer which may be automatically released after having been raised to certain positions.

Another object of the invention is to provide means for bringing the elevating device automatically into engagement with the gravity rammer.

Other objects of the invention will be more clearly understood by reference to the following specification and accompanying drawings and will be more particularly pointed out in and by the appended claims.

In the drawing:—Figure 1 is a side view of the machine. Fig. 2 is a rear view of the elevating and releasing device. Figs. 3 and 4 are a top view and side elevation respectively, partly in section of the device for raising and lowering the frame of the machine with respect to the wheel.

The machine comprises a truck 1 mounted on supporting wheels 4. The truck 1 is provided with extensions 2 in the form of handles, whereby the machine may be advanced by the operator to any desired position on the road to be paved. The wheels 4 are carried by independent axles 3, which are supported in the truck 1 and the axles carry on their inner ends a frame 27. Gear wheels 5 are provided for imparting rotation to the wheels 4 and pinions 8 are slidably but not rotatably mounted on a shaft 7; said pinions 8 mesh with gears 5. Levers 10, pivotally mounted on the truck in the bracket 11, serve for throwing one of the pinions 8 into or out of mesh with the gear wheels 5. A bevel gear 12 mounted on the shaft 7 meshes with a bevel gear 13, secured to a shaft 14. The shaft 14 is provided on its rear end with a crank 16 and is supported in bearing 15.

It will be understood that the operator may advance the machine slowly by throwing both pinions 8 into mesh with the gear wheels 5 and by turning the crank 16. When either one of the pinions 8 is disengaged from the respective gear 5 the direction in which the machine is advanced may be changed in accordance with that pinion 8, which is still in mesh with the respective gear 5.

The lower portion of the frame 27 carried by axles 3 incloses a gravity hammer 28 and said portion may serve for guiding the hammer in the reciprocating movement of the same. Means are provided for adjusting the frame 27 at any desired angle with respect to the vertical and for locking said frame in the adjusted position. For this purpose rods 31 are pivoted at 30 to brackets 29 secured to the frame 27 near the top end thereof. The rear ends of the rods 31 extend through a transverse member 32, supported in brackets 33 on the truck 1. The extreme ends of the rods 31 are connected to a nut. An adjusting screw projecting through a yoke 36 is in threaded engagement with said nut and carries on its outer end a hand wheel 37. The yoke 36 preferably is pivoted on the transverse member 32 so as to be adjustable in different angles which the rods 31 assume when the frame 27 is adjusted to the right or left of the position shown in Fig. 1. It will be readily seen that by turning the hand wheel 37 the desired adjustment of the frame 27 may be obtained, the adjusting screw being stationary in longitudinal direction with respect to the yoke 36.

The gravity hammer 28 is suspended on a rack 40, meshing with gear wheel 47 on the shaft 51 which last named shaft may be rotated by gearing actuated by the crank 66. The rack 40 is preferably bifurcated at its lower end; a bolt *j* transversely disposed in said lower end may be provided with a roller and extends into a curved groove *k* on a hook *l*. This hook may carry the gravity hammer, the lower end of the hook engaging a bolt *m* mounted in a bracket at the top of the hammer 28. The hammer is furthermore provided at its upper end with a cam or a projecting element *n* and the hook *l* carries on its upper end a cam or stop *o*. The gear wheel 47 is loosely mounted on its shaft 51 and is adapted to be connected with a clutching device *p*, said clutching device being rigidly mounted on the shaft 51. When the rack is raised by rotating the crank 66, the hammer 28 will thus be elevated until the cam *o* strikes a stop *o'*. When this happens the hook *l* will turn in the direction indicated by the arrow in Fig. 2, the bolt *j* sliding in the groove *k*. The lower end of the hook will then release the gravity hammer by sliding off the bolt *m*. The clutching device *p* is then released from the gear wheel 47 causing the rack to drop. In the forward movement of the rack the hook *l* will strike the cam *m* of the hammer with the bolt *o* and by this means the hook will be turned so that the lower end thereof enters underneath the transverse bolt *m*. The clutching device *p* is again brought into engagement with the gear wheel 47 and the hammer may be elevated thereby.

The clutching device *p* may be connected with and disconnected from the gear wheel 47 in various ways. One preferred construction is shown in Fig. 2 in which the clutching device is rigidly connected with a preferably conical disk *q*. A pawl *r* pivotally mounted on the frame engages the inner surface of the disk *q*, said pawl having the form of a bell crank lever. A rod *s* projecting upwardly from the hammer 28 is provided at its upper end with a hook *t*. In the downward movement of the hammer the hook *t* will strike against the free arm of the pawl *r* moving thereby the disk *q* out of connection with the gear wheel 47. When the clutching device *p* is out of engagement with said gear wheel the rack 40 is free to fall downwardly. When the rack reaches its lowest point a transverse arm *u* on top of said rack and provided with a slanting surface *v* will engage the outer conical surface of the disk *p* moving the same again into engagement with the gear wheel 47. From the foregoing it will be understood that the clutching device is released only as long as the rack is moving downwardly.

For the purpose of adjusting the drop of the hammer a rod is slidably disposed on one of the bars 2 of the truck 1, said rod *x* being provided with a rack portion *y* near its inner end. The rack *y* meshes with a gear wheel *z* secured to the lower end of a preferably vertical rod *a'*. A plurality of stops *o'* are projecting from said rod *a'*, four of said stops being shown in Fig. 2. The rod *a'* may be rotated by means of the rod *x*, so that one of the stops *o'* may project into the path of the bolt *o* transversely disposed on the hook *l*. The engagement of the bolt *o* with the stop *o'* causes the release of the gravity hammer 28 from the rack 40.

An adjustable steering wheel 20 is provided preferably near the forward end of the truck 1 and said wheel may serve for steering the machine in any direction. As shown in Fig. 1 the wheel 20 is carried on a spindle 19 mounted in a bracket 18 on the truck 1. A ring *a*, slidably fastened on the spindle 19 is secured to the bracket 18 and may be rigidly connected with the spindle 19 by means of a set-screw *b* or a similar device. When during the paving operation the wheel 20 is placed on the curb stone or on the side walk the truck and therefore also the rammer frame 27 will assume a slanting position with respect to the pavement. To avoid the necessity of adjusting the position of the frame 27 by means of the rods 31 and the hand wheel 37 the set-screw *b* may be loosened temporarily so that the spindle 19 will slide upwardly in the bracket 18 until a collar *c* on the spindle engages the ring *a*. It is advisable to make the distance between the normal position of the ring *a* and the collar equal to the normal height of a curb stone. By this means the truck 1 will then return into substantially horizontal position, causing thereby the adjustment of the frame 27 in vertical direction.

Means are provided for adjusting the height of one of the axles 3 with respect to the other axle, but independently thereof for the purpose of adapting the entire machine to the surface of the road which very often may be curved for draining purposes. It may also be necessary to apply this adjustment when one of the supporting wheels 4 is placed on stones which are not embedded into the surface of the road while the other supporting wheel 4 is standing on the finished pavement. For this purpose one of the axles 3 is not resting in a cylindrical bore of the truck 1, but is displaceably disposed within a slot *e* provided in a casing *d* mounted on the truck 1. Stiffening portions *f* may be provided on the axle for the purpose of securing a better guidance of the same within the slot *e*. A lever *g* pivotally mounted on the truck 1 engages with its forward end the axle near the stiffening portions *f*, while the other end *h* of said lever may be adjusted up or downwardly with respect to the truck by means of the screw *i* secured thereto. In elevating the arm *h* of the lever the forward end *g* of said lever will depress the axle 3 and therefore one side of the machine will be higher than the other side.

We claim:

1. In a road making machine the combination with a gravity hammer, of a rack, means for raising and lowering said rack, a hook shaped element provided with a circular groove, said element being in slidable engagement in said groove with said rack, one end of said element being loosely connected with said hammer and being adapted to be disengaged therefrom when sliding motion in one direction is imparted to said element, means for imparting sliding motion thereto when said hammer has reached a certain height, said element being adapted to reëngage said hammer, when said rack is lowered to the same.

2. In a road-making machine the combination with a gravity hammer, a rack detachably connected with said hammer, means for disconnecting said rack from said hammer, means for elevating said rack and means operated by the hammer falling for releasing said rack from its elevating means.

3. In a road making machine the combination with a gravity hammer, a rack detachably connected with said hammer, a gear engaging said rack, an actuating shaft for said gear, a clutching device placing said shaft in operative position with said gear and means operated by the hammer falling and in coaction with said clutching device for disengaging said shaft and said gear.

4. In a road making machine the combination with a gravity hammer, a rack detachably connected with said hammer, a gear meshing with said rack, an actuating shaft for said gear, a clutching device on said shaft, said rack being provided with a projecting portion adapted to engage said clutching device and place the same in operative position when said rack is lowered.

5. In a road making machine the combination with a truck, supporting wheels, axles for said wheels, a casing for one of said axles, said casing being provided with a vertical slot wherein said axle is slidably secured, and a lever pivotally mounted on said truck, one arm of said lever engaging said axle and means for vertically adjusting the other arm of said lever.

In testimony whereof, we have signed our names to this specification in the presence of two subscribing witnesses.

WILHELM HERMANN NORDSTRÖM.
NIELS CHRISTIAN QVIST.

Witnesses:
F. PETERSEN,
H. FLEISCHER.